Oct. 11, 1966  A. J. SAGADY  3,278,119
AUTOMATIC CHOKE AUXILIARY THERMOSTAT
Filed July 10, 1964

INVENTOR.
Alexander J. Sagady
BY
J. L. Carpenter
ATTORNEY

United States Patent Office 3,278,119
Patented Oct. 11, 1966

3,278,119
AUTOMATIC CHOKE AUXILIARY THERMOSTAT
Alexander J. Sagady, Center Line, Mich., assignor to General Motors Corporation, Detroit, Mich., a corporation of Delaware
Filed July 10, 1964, Ser. No. 381,865
4 Claims. (Cl. 236—91)

This invention relates to chokes for internal combustion engines and more particularly to a choke valve control.

Carburetors conventionally include a choke valve for limiting the amount of air entering the carburetor under starting and cold operating conditons so that a rich mixture is supplied to the engine. The position of the choke valve is often controlled by an automatic choke which includes a piston responsive to manifold vacuum and a bimetallic thermostat responsive to engine temperature. The thermostat biases the choke valve to closed position under starting and cold operating conditions while the piston partially opens the choke valve as the engine starts to avoid flooding and subsequent stalling. As the engine warms up to normal operating temperature, the thermostat gradually moves the choke valve to open position.

This arrangement works well under most cold engine starting conditions unless the ambient temperature is very low, such as below −20° F. Under such low temperatures, the biasing force of the thermostat is too strong to be overcome by the piston and, accordingly, the choke valve stays closed as the engine starts so that the engine floods and stalls.

The choke valve control of this invention overcomes this disadvantage of such automatic chokes by providing a second thermostat which limits the bias exerted on the choke valve by the main thermostat when the temperature is below a predetermined value.

One feature of this invention is that it provides an improved choke valve control for an internal combustion engine fuel system. Another feature of this invention is that the choke valve control includes a thermostat responsive to engine temperature, a piston responsive to engine manifold vacuum, and a second thermostat responsive to ambient temperature which limits the biasing force of the first thermostat when the temperature is below a predetermined value. A further feature of this invention is that the choke valve control functions in its normal manner when the temperature is above the predetermined value.

These and other features of this invention will become apparent from the following specification and drawing wherein.

Figure 1:
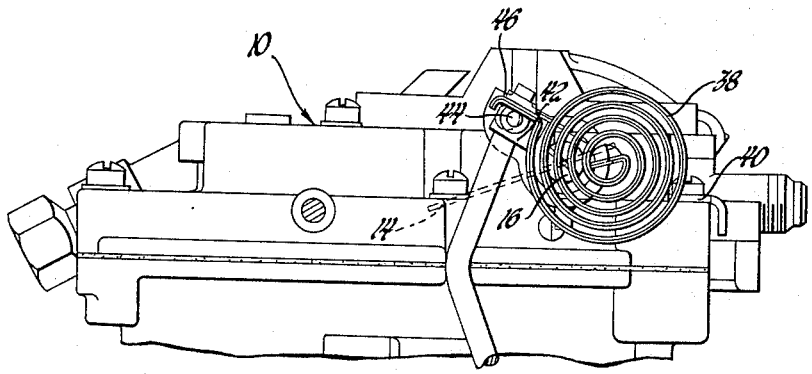
FIGURE 1 is a partial side view of a carburetor embodying a choke valve control according to this invention.

Referring now to the drawing, a carburetor designated generally 10 includes an air inlet or induction passage 12. A choke valve 14 is rotatably mounted within the passage 12 on a shaft 16 and controls the amount of air entering the carburetor. The rotation of shaft 16 is controlled by an automatic choke designated generally 18 which is located within a housing 20. A bimetallic thermostat 22 includes a hooked end 24 that engages an arm 26 of a plate 28 which is secured to the shaft 16. An engine vacuum operated piston 30 is slidably mounted in the cylinder 32. A link 34 connects the piston to a second arm 36 of the plate 28.

Figure 2:
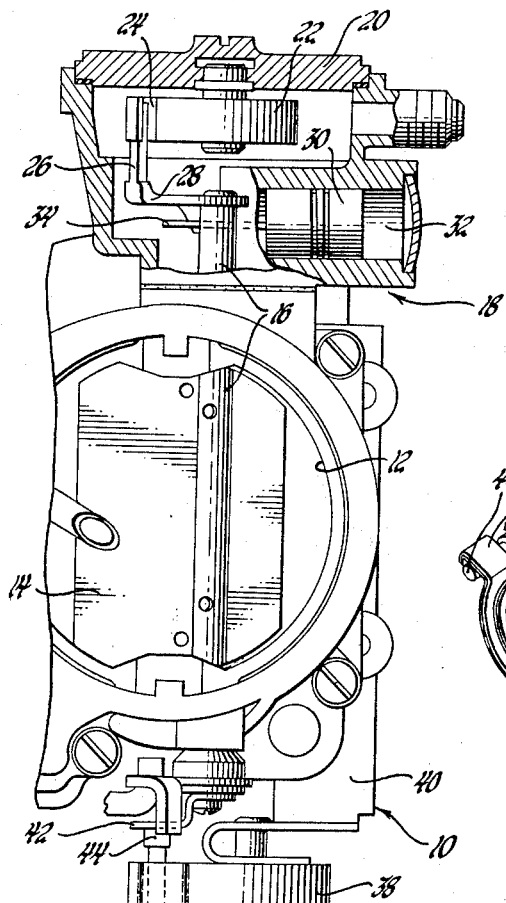
FIGURE 2 is a partially broken away plan view of the carburetor.
Figure 3:
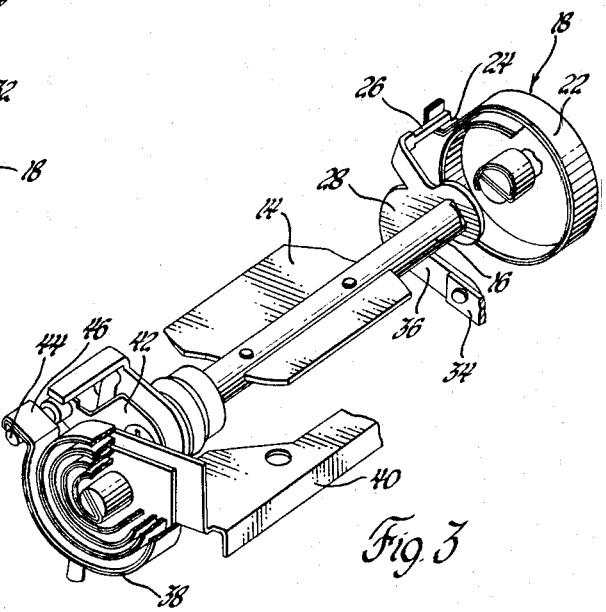
FIGURE 3 is a partially broken away isometric view of the choke plate and the thermostats.

When the engine is cold the thermostat 22 rotates the plate and shaft 16 in a direction closing the choke valve so that a rich mixture is supplied to the engine. When the engine is running, the choke valve 14 should be partly open to permit ambient air to enter the carburetor and thereby prevent flooding. Manifold vacuum applied to the cylinder 32, when the engine starts, moves the piston 30 to the right as viewed in FIGURE 2 thus partially opening the choke valve and admitting air.

Under extremely cold operating conditions, such as below −20° F., the biasing force of the thermostat 22 is sufficiently great so that the piston 30 cannot open the valve 14 when the engine starts.

The choke valve control of this invention includes a second thermostat 38 which is mounted on a bracket 40 secured to the carburetor 10. An arm 42 is secured to the shaft 16 and carries a pin 44 which is adapted to be engaged by the hook portion 46 of thermostat 38. The thermostat 38 is adjusted so that it will only engage the pin 44 when the ambient temperature is below a predetermined value.

The main thermostat 22 and the secondary thermostat 38 tend to unwind with decreasing values of temperature. Thus, when the temperature drops below the predetermined value, the second thermostat will exert a bias on the choke valve which is in opposition to that bias exerted by the main thermostat. The force exerted by the second thermostat in addition to the force exerted by the piston 30 opens the choke valve when the engine starts to prevent flooding and stalling despite extremely cold operating conditions.

Thus, this invention provides an improved choke valve control.

I claim:

1. In a fuel system for an internal combustion engine, the combination comprising, means for varying the ratio of the air-fuel mixture supplied to the engine, first temperature responsive means operatively connected to said varying means and exerting a mixture enriching bias thereon, vacuum responsive means operatively connected to said varying means and exerting a mixture leaning bias thereon, and second temperature responsive means adapted to exert a mixture leaning bias on said varying means to assist said vacuum responsive means in overcoming the bias of said first temperature responsive means and causing said varying means to lean the mixture when the temperature is below a predetermined value.

2. In a fuel system for an internal combustion engine, the combination comprising, a choke valve adapted to limit air flow to the engine, a first coiled bimetallic thermostat operatively connected to said choke valve and exerting a valve closing bias thereon, vacuum responsive means operatively connected to said choke valve and exerting a valve opening bias thereon, a second coiled bimetallic thermostat engageable with said choke valve when the temperature is below a predetermined value to exert a valve opening bias thereon and assist said vacuum responsive means in opening said choke valve.

3. In a carburetor for an internal combustion engine including an induction passage, a choke valve, a shaft rotatably mounting said choke valve in said passage, first temperature responsive means operatively connected to said shaft and exerting a bias thereon in a choke valve closing direction, and vacuum responsive means operatively connected to said shaft and exerting a bias thereon in a choke valve opening direction, the improvement comprising a temperature responsive element operatively connected to said shaft to exert a bias thereon in a choke valve opening direction whereby said vacuum responsive means is assisted in opening said choke valve against the bias of said first temperature responsive means at temperatures below a predetermined value.

4. In a carburetor for an internal combustion engine including an induction passage, a shaft rotatably mounted on said carbuertor and passing through said induction passage, a choke valve within said induction passage secured to said shaft for conjoint rotation therewith to control the air entering said induction passage, first temperature responsive means operatively connected to said shaft and exerting a choke valve closing bias thereon, vacuum responsive means operatively connected to said shaft and exerting a choke valve opening bias thereon, the combination comprising, a lever arm mounted on said shaft and carrying a pin, and second temperature responsive means mounted on said carburetor and adapted to engage said pin and exert a choke valve opening bias on said shaft only when the temperature is below a predetermined value.

References Cited by the Examiner

UNITED STATES PATENTS

| | | | |
|---|---|---|---|
| 2,043,834 | 6/1936 | Marbury | 236—91 |
| 2,601,028 | 6/1952 | Kersten | 236—91 X |
| 3,174,687 | 3/1965 | Gilbert | 236—91 |
| 3,185,453 | 5/1965 | Menneson | 261—39 |

ALDEN D. STEWART, *Primary Examiner.*